INVENTOR
Siegfried Richard Walter Kaule

BY Spencer & Kaye

ATTORNEYS

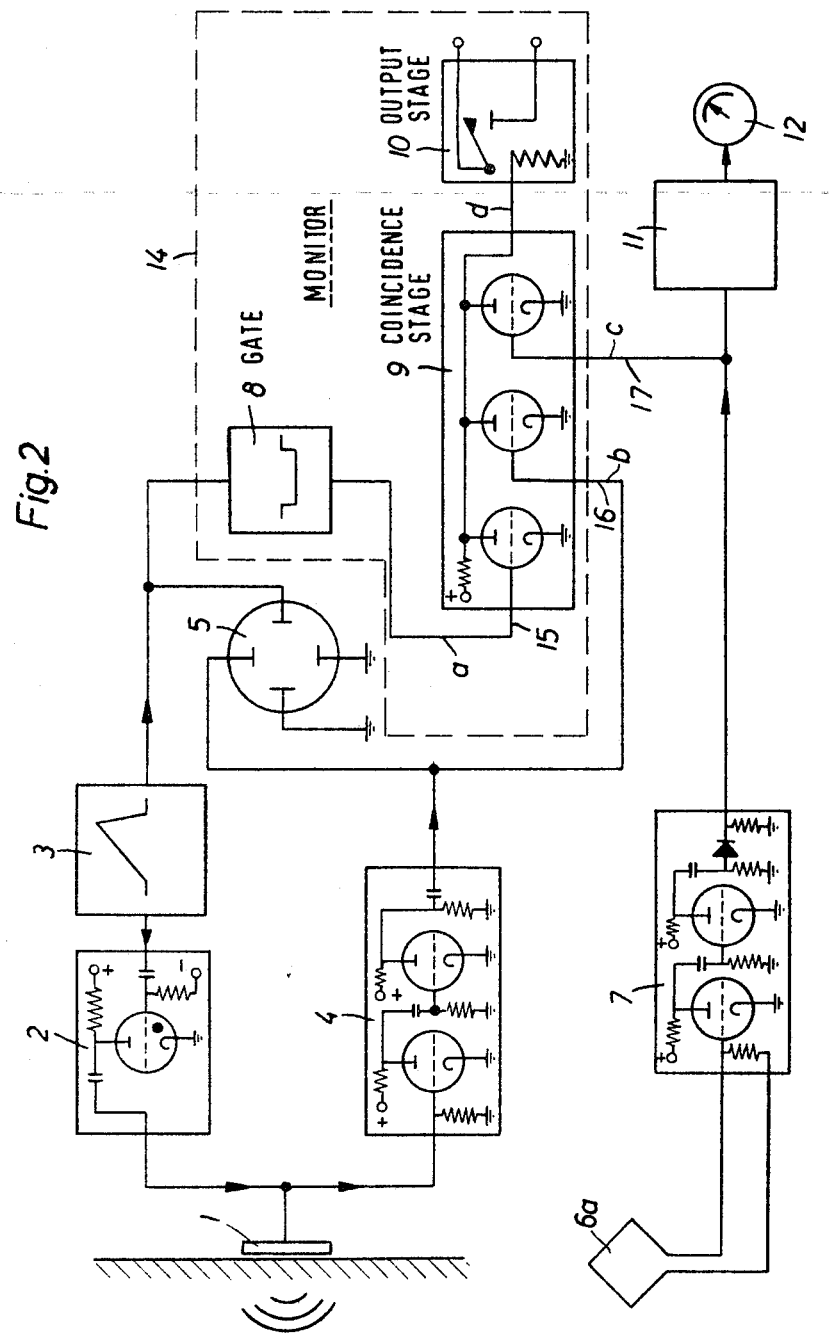

United States Patent Office 3,404,560
Patented Oct. 8, 1968

3,404,560
METHOD AND APPARATUS FOR SUPPRESSING NOISE DURING ULTRASONIC TESTING
Siegfried Richard Walter Kaule, Thurner Strasse 111, Cologne-Dellbruck, Germany
Filed Sept. 7, 1965, Ser. No. 485,410
Claims priority, application Germany, Sept. 12, 1964, K 53,988
9 Claims. (Cl. 73—67.5)

ABSTRACT OF THE DISCLOSURE

Method and apparatus for suppressing noise pulses affecting ultrasonic testing. The noise pulses, which can originate from electrical, magnetic or electromagnetic noise fields in the vicinity of the ultrasonic testing zone and be received and misinterpreted as being ultrasonic test pulses, are suppressed by picking up signals from the noise fields, amplifying the signals and utilizing the amplified signals to render ultrasonic testing insensitive for the duration of the noise pulses.

---

The present invention relates generally to the ultrasonic field, and, more particularly, to a method of and apparatus for suppressing interference pulses caused by electric, magnetic or electromagnetic noise fields in the vicinity of an ultrasonic flaw detector when used for the non-destructive testing of materials.

When ultrasonic pulses are used to test materials, or for similar tasks in medicinal diagnosis, for which either the echo or through transmission method may be adopted, delayed coincidence devices known as monitors are often used. Their task is to pick out from the entirety of the received pulses those pulses which return in a definite, preset time from the instant of emission, i.e., which have a definite transmission time. Such echoes then cause an alarm signal to be given or their amplitude is recorded.

When this process is carried out in practice, difficulties are often caused by machines, switches, contacts and the like in the vicinity of the point at which testing is being performed, producing disturbing electric pulses—hereinafter referred to as noise—which create an electrical or magnetic noise field. This field is inevitably picked up by the amplifiers required for the testing process and is indicated in the same manner as the true ultrasonic signals, i.e., the echoes returned from irregularities in the workpiece being examined. As a result of such noise pulses, it is possible for a component which is sound to be indicated as being faulty.

Methods are already known which attempt to overcome this difficulty, but most of them suffer from such severe drawbacks that in many cases they cannot be adopted.

Of the processes known per se, the most effective is to surround the entire test apparatus and the object being tested in a Faraday cage. The disadvantages of this should be apparent.

A second method of overcoming the noise makes use of the fact that electrical disturbances usually comprise isolated and not periodically recurring pulses, whereas the test with ultrasonic equipment uses pulses which are repeated regularly with a "pulse repetition frequency" of between about 50 and 3,000 times a second.

Using this method, only those signals are assessed as "genuine" which exhibit, or instance, five successively repeated pulses, while signals comprising only one or two pulses are discarded as "false." The application of this method is severely hampered by the fact that, at high testing speeds, i.e., when the "probe" emitting the ultrasonic pulses is moved at a fast rate across the workpiece, it is possible for "genuine" signals to comprise only one or two echo pulses, since the flaw is only in the sound beam for a very short time.

With this prior art in mind, it is a main object of the invention to eliminate noise in an ultrasonic testing device without the aforementioned disadvantages.

Another object is to provide for rendering an ultrasonic testing device insensitive for the duration of noise pulses.

A further object is to provide for rendering a monitor device connected behind an ultrasonic testing device insensitive during noise pulses.

These objects and others ancillary thereto are accomplished in accordance with preferred embodiments of the invention wherein the electrical, magnetic or electromagnetic field of the noise pulses is received by an antenna and/or directly from the mains. They are amplified, and then a signal is produced which either blocks the amplifier of the ultrasonic detector for the duration of the noise pulse or prevents the signals from the ultrasonic detector from being passed on to automatic monitoring or recording devices.

Additional objects and advantages of the present invention will become apparent upon consideration of the following description when taken in conjunction with the accompanying drawings in which:

FIGURE 2 is a block diagram of another embodiment of a flaw detector for automatic inspection, where the noise signal is conveyed to a coincidence stage and having means to measure the average noise level.

Figure 1:
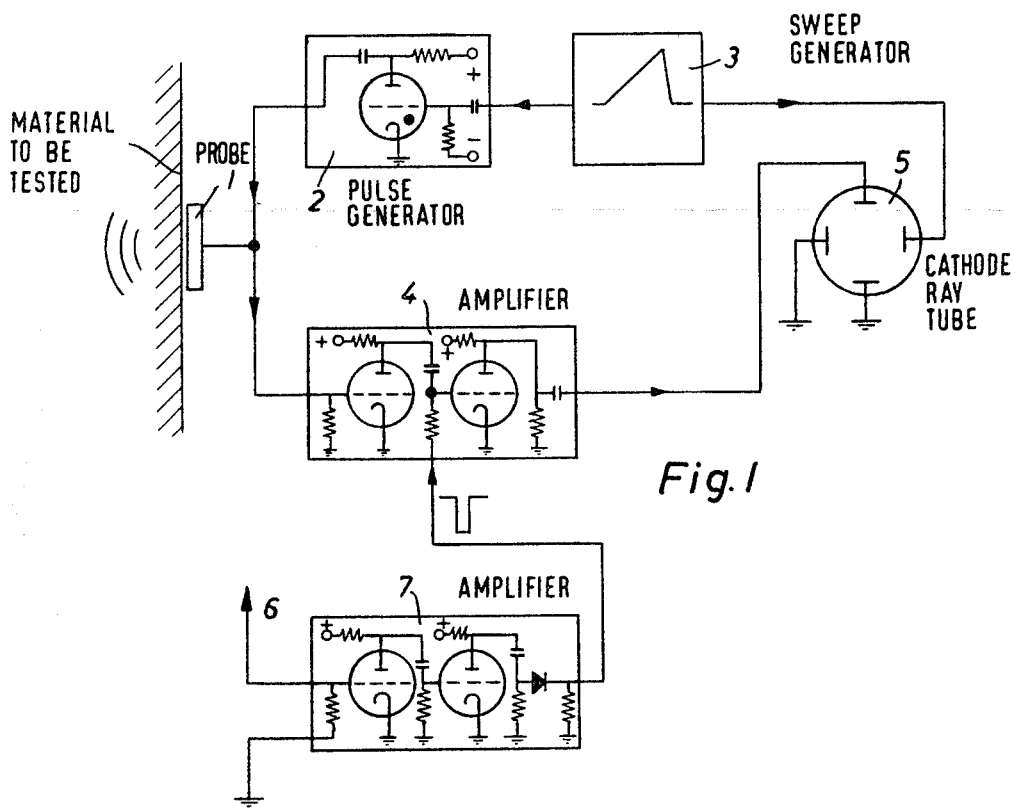
FIGURE 1 is a block diagram of an ultrasonic flaw detector of which the amplifier is blocked directly during an interference pulse.

With more particular reference to the drawings, FIGURE 1 shows an arrangement of an ultrasonic detector for testing materials. The probe 1 receives the high frequency electric pulses from the pulse generator 2 and converts them into sonic pulses. The sweep generator 3 provides the time-base voltage for the cathode-ray tube 5 in synchronism with the emitted ultrasonic pulses. The probe 1 or a second probe distinct from the emitting probe receives the echoes of the ultrasonic pulses and conveys them via the amplifier 4 to the cathode-ray tube.

According to the invention, noise signals are eliminated by being picked up capacitively directly from the mains and, in the vincinity of the detector, by means of the antenna 6. They are amplified by the amplifier 7, which produces a signal which is fed to and blocks the amplifier of the ultrasonic detector. The amplifier 7 can, for instance, comprise a high frequency amplifier element, followed by a rectifier which produces D.C. voltage pulses, or a pulse generator which is made to operate by the noise pulses.

The use of the invention is not solely confined to the pulse-echo method, but may be used with all methods in which the ultrasonic pulses are indicated separately according to their transmission time.

In equipment used for automatic testing installations, the ultrasonic detector is augmented in a well-known manner by a device 14 known as a monitor and denoted by the blocks 8, 9 and 10 in FIGURE 2. The principle on which it functions is as follows. The gate stage 8 produces a square-wave voltage of preselected width, synchronously with the emitted pulse. This pulse is delayed by a preset time-lag relative to the emitted pulse. This gate voltage is conveyed to a first input 15 of the coincidence stage 9, while the echo pulses from amplifier 4 are fed into the second coincidence input 16. Stage 9 only passes on to the output stage 10 those echo pulses which coincide in time with the gate voltage.

Figure 3A:
FIGURES 3a through 3d show time plots of different wave forms of the coincidence stage shown as voltage/time representations.
Figure 3B:
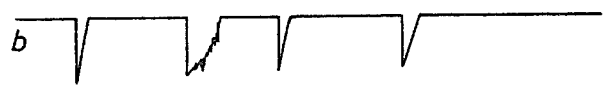
Figure 3C:
Figure 3D:
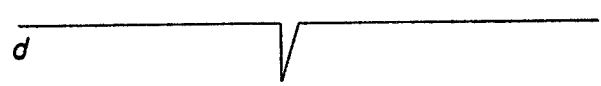

The function of the coincidence stage 9 will become clearer when FIGURES 3a to 3d are considered together with FIGURE 2. At the grid input of the first one of three tubes, the rectangular gate voltage a generated by the gate stage 8 of FIGURE 2 is provided. All signals b of the amplifier 4 of the flaw detector of FIGURE 2 are connected to the grid of the second tube. There are four such signals, of which two appear during the time of the gate pulse. Of these two signals, the first one is shown to have a somewhat different shape for providing a better understanding since it represents an interference pulse. However, this is solely for clarity since in actuality, the noise pulse can have the same wave shape as the other pulses. The signal c arrives from the amplifier 7 via input 17 to the third grid, and this signal is only caused by the interference pulse picked up by the antenna. Whereas the first two grids receive negative wave forms, the third one must receive a positive one to cancel the signal of the noise pulse at the output where signal d appears. Therefore, only the true pulse during the gate volage is left to pass to stage 10 of FIGURE 2. Stage 10 converts the pulse signals into broadened pulses or direct voltages, depending on the task of the particular monitor. In many cases, the output stage only has to produce a "Go—no go" signal when the amplitude of the selected echo exceeds a preset level. As shown in FIGURE 2, stage 10 includes, as an example, a mechanical relay, the contact of which opens or closes in response to the signal d and may, for instance, connect or disconnect power to different lamps (not shown). A green lamp might be provided and connected to emit light so long as the output of coincidence stage 9 does not furnish a signal to stage 10. The presence of the signal d, as shown in FIGURE 3d, would change the contact position of the mechanical relay to provide power to a warning lamp, perhaps of a red color. The mechanical relay might instead, or also, be connected to a bell to give an acoustical warning of the presence of the signal d. All these various testing outputs, as well as others, such as counting devices, may be used at stake 10 to record the pulses which pass the stage 9. Since these output devices are all within the skill of the art and are not necessary for the practice of the present invention, they will not be described in detail.

In addition to the high frequency component in their frequency spectrum, the noise signals may also contain D.C. components, so that half-wave rectification with different rectifier polarity would produce signals with widely differing amplitudes. In order that both positive and negative noise signals can be suppressed, it is preferable to use a full-wave rectifier circuit in the rectifier part of amplifier 7.

The antenna 6 of a noise suppression device, as per the invention, is not confined to the capacitive form illustrated in FIGURE 1. It can also be inductive, taking the form of a frame or loop aerial 6a as indicated in FIGURE 2, or a combination of various forms of aerials. In particular, it may possess a special characteristic in one direction, say for the following case. A radio transmitter in the vicinity may produce a certain low noise level which, with an omnidirectional antenna 6, would keep the noise suppression device continuously in action, although most pulses exceeding the noise level would permit testing to a certain degree. With a directional characteristic, excluding reception from the direction of the disturbing transmitter, but permitting reception from all other directions from which higher amplitude pulse noise may arrive, this drawback can be overcome.

In conjunction with an apparatus which can be used to carry out the method of the invention, it may also prove useful to include a supplementary device which indicates the average noise level, i.e., the duration of all noise pulse together per unit time. If their distribution is irregular with respect to time, this average noise level gives an indication of the frequency with which genuine signals may be anticipated to coincide with noise pulses and will thus be suppressed with the latter and not indicated on the screen. This device, which is denoted in FIGURE 2 by block 11 and the subsequent instrument 12, is described in the book of I. A. D. Lewis and F. H. Wells, Millimicrosecond Pulse Techniques, Pergamon Press Ltd., London (1954). The instrument 12 is a voltmeter which indicates the voltage output of the pulse integrator 11.

It will be understood that the above description of the present invention is susceptible to various modifications, changes and adaptations, and the same are intended to be comprehended within the meaning and range of equivalents of the appended claims.

What is claimed is:

1. In ultrasonic apparatus for testing materials for flaws, the improvement comprising apparatus for the suppression of noise pulses originating from electrical, magnetic or electromagnetic noise fields received by said ultrasonic apparatus, which pulses could be falsely interpreted as indicating material flaws, said suppression apparatus including:
   (a) means for picking up said noise fields;
   (b) means for amplifying the signals from said picking-up means; and
   (c) means connected to said amplfying means for utilizing the picked-up and amplified noise field signals to render said ultrasonic apparatus insensitive to testing for the duration of said noise pulses.

2. Apparatus for suppressing noise pulses which would otherwise disturb ultrasonic testing, comprising, in combination:
   ultrasonic testing means for issuing an ultrasonic pulse and for receiving the pulse after it passes through material to be tested to detect flaws in such material;
   means for receiving pulsating noise signals from noise fields in the vicinity of said testing means;
   means connected to said receiving means for amplifying said noise signals; and
   means connected to said amplifying means and to said testing means for rendering said testing means insensitive for the duration of noise pulses picked up by said receiving means.

3. Apparatus as defined in claim 2 wherein said amplifying means includes a rectifier stage providing full-wave rectification.

4. Apparatus as defined in claim 2 wherein said receiving means includes an antenna.

5. Apparatus as defined in claim 4 wherein said antenna has a directional characteristic.

6. Apparatus as defined in claim 2 comprising means connected to said amplifying means for indicating the average noise level.

7. Apparatus for suppressing noise pulses which would otherwise disturb ultrasonic testing, comprising, in combination:
   ultrasonic testing means for issuing an ultrasonic pulse and for receiving the pulse after it passes through material to be tested to detect flaws in such material in accordance with signals appearing at the output thereof;
   means for receiving pulsating noise signals originating from electrical, magnetic or electromagnetic noise fields in the vicinity of said testing means;
   means connected to said receiving means for amplifying said noise signals; and
   means connected to said amplifying means and to said testing means for rendering the output of said testing means insensitive for the duration of noise pulses picked up by said receiving means.

8. Apparatus for preventing noise pulses from disturbing ultrasonic testing, comprising, in combination:
   ultrasonic testing means for issuing an ultrasonic testing pulse and for receiving an indication of such pulse after it passes through material to be tested to detect flaws in such material;

means for receiving pulsating noise signals from noise fields in the vicinity of said testing means;

means connected to said receiving means for amplifying said noise signals; and monitoring means having an output which is useful for determining whether there are flaws in such material, said means being connected to said testing means and to said amplifying means for preventing a signal from appearing at its output for the duration of noise pulses picked up by said receiving means.

9. A method for suppressing noise pulses affecting testing by means of ultrasonic pulse testing means wherein the noise pulses originate from electrical, magnetic or electromagnetic noise fields in the vicinity of the ultrasonic testing zone, comprising the steps of:

picking up signals from the noise fields in the vicinity of an ultrasonic testing zone;

amplifying said signals; and rendering said ultrasonic testing means insensitive for the duration of such noise pulses by utilizing such amplified signals.

References Cited

UNITED STATES PATENTS

| | | | |
|---|---|---|---|
| 2,466,959 | 4/1949 | Moore | 343—17.1 XR |
| 2,622,150 | 12/1952 | Coulter et al. | 330—149 |
| 2,736,193 | 2/1956 | Van Valkenburg et al. | 73—67.9 |
| 3,047,804 | 7/1962 | Peer et al. | 330—149 XR |
| 3,295,362 | 1/1967 | Wood et al. | 73—67.9 |

RICHARD C. QUEISSER, *Primary Examiner.*

J. P. BEAUCHAMP, *Assistant Examiner.*